US009070251B2

(12) United States Patent
Laputz et al.

(10) Patent No.: US 9,070,251 B2
(45) Date of Patent: Jun. 30, 2015

(54) MULTI-TIERED STATIC CHAIN OF TRUST (71) Applicant: IGT, Reno, NV (US)

(72) Inventors: Jerrod L. Laputz, Sparks, NV (US);
Wu Chih Wei, New Taipei (TW);
Xuedong Chen, Reno, NV (US); Scott Timothy Gowin, Reno, NV (US)

(73) Assignee: IGT, Las Vegas, NV (US)

(*) Notice: Subject to any disclaimer, the term of this patent is extended or adjusted under 35 U.S.C. 154(b) by 16 days.

(21) Appl. No.: 13/791,638

(22) Filed: Mar. 8, 2013

(65) Prior Publication Data

US 2014/0256419 A1    Sep. 11, 2014

(51) Int. Cl.
G06F 11/30      (2006.01)
G07F 17/32      (2006.01)
G06F 21/57      (2013.01)
H04L 9/32       (2006.01)
H04K 1/00       (2006.01)
G06F 19/00      (2011.01)
A63F 9/24       (2006.01)

(52) U.S. Cl.
CPC ............ G07F 17/3241 (2013.01); G06F 21/57 (2013.01); G06F 21/575 (2013.01); G06F 2221/2109 (2013.01)

(58) Field of Classification Search
CPC ..... G06F 21/57; G06F 21/527; G06F 21/575; G06F 2221/2109; G07F 17/3241; G07F 17/32; G07F 17/323; G07F 17/3232
See application file for complete search history.

(56) References Cited

U.S. PATENT DOCUMENTS

| 5,643,086 | A   | * | 7/1997  | Alcorn et al. ............ 463/29 |
| 5,644,704 | A   |   | 7/1997  | Pease et al. |
| 6,149,522 | A   | * | 11/2000 | Alcorn et al. ............ 463/29 |
| 6,488,581 | B1  |   | 12/2002 | Stockdale |
| 6,595,856 | B1  | * | 7/2003  | Ginsburg et al. ......... 463/29 |
| 6,962,530 | B2  |   | 11/2005 | Jackson |
| 7,783,040 | B2  |   | 8/2010  | Jackson et al. |
| 7,798,900 | B2  |   | 9/2010  | Nguyen et al. |
| 7,841,941 | B2  |   | 11/2010 | Sharpless et al. |
| 8,150,036 | B2  |   | 4/2012  | Paykin et al. |
| 2003/0216172 | A1 | * | 11/2003 | LeMay et al. ............ 463/29 |
| 2006/0179302 | A1 | * | 8/2006  | Hatakeyama ............ 713/164 |
| 2006/0179324 | A1 | * | 8/2006  | Hatakeyama ............ 713/187 |
| 2010/0151939 | A1 | * | 6/2010  | Tanimura ................. 463/29 |

OTHER PUBLICATIONS

Extended European Search Report for European Patent Application No. EP 14147930, dated Jun. 12, 2014, 11 pages.

* cited by examiner

*Primary Examiner* — Dede Zecher
*Assistant Examiner* — Trang Doan
(74) *Attorney, Agent, or Firm* — Neal, Gerber & Eisenberg LLP (57) ABSTRACT A multi-tiered static chain of trust is established in a computer system which utilizes a first authentication program stored on a first memory device to authentic data stored on a second memory device. If the data stored on the second memory device is authenticated, then a second authentication program stored on the second memory device authenticates data stored on a third memory device. If the data on the third memory device is authenticated the computer system is allowed to utilize the data stored on the third memory device. The data stored on the third memory device is indirectly authenticated while the data is being used by authenticating the data stored on the first memory device.

18 Claims, 4 Drawing Sheets

MULTI-TIERED STATIC CHAIN OF TRUST

BACKGROUND OF THE INVENTION

This invention relates to a verifiable secure and trusted boot process for computing devices, and more particularly to a new and improved electronic gaming machine and method which facilitates quickly verifying the integrity of system firmware, the operating system and game software within the machine without limiting the upgradability of the system firmware, the operating system or game software.

Electronic Gaming Machines (EGMs), otherwise known as slot machines, constitute the most profitable form of gambling in casinos today. EGMs are a combination of specialized hardware and software which present a wagering game of chance to a player. Typical EGM hardware includes a bill acceptor for receiving money, a button panel for receiving player input, a display device for presenting the game, a credit meter for displaying to the player an amount of money or credits available for wagering, a ticket printer for dispensing money vouchers, and a master game controller for interacting with the other hardware components and executing EGM software. Typical EGM software includes system firmware, an operating system and game software for controlling the outcome and presentation of the game to the player.

Nearly every gaming jurisdiction in the world has some set of regulations regarding EGMs. EGMs are heavily regulated because they have the potential to award players substantial amounts of real money, thereby making EGMs enticing targets for crime. The regulations protect both the casinos and the players from fraud perpetrated by unscrupulous actors. Since the software controls the functionality of the EGM, and since the hardware is easily verifiable and under constant surveillance, unauthorized modifications to the software represent the most likely method of altering the payout of the EGM. Therefore, it is a very common regulatory requirement for the casino, or manufacturer, to have some mechanism for verifying the integrity of the software stored on the EGM.

Many gaming authorities require that each version of new EGM software be approved by the authority before the software is released on EGMs available to the public. The gaming authority typically subjects each new game to a rigorous testing process to ensure that the payout percentage of the game is controllable and accurate and to ensure that there are no backdoors or hidden commands for changing the payouts, among other things. Once approved, the gaming authority typically requires that the manufacturer have some method of proving, on demand, that the EGM software in a particular EGM is authentic and identical to the version the authority had previously approved. Additionally, the casino or multi-player progressive contractor (typically the EGM manufacturer) wishes to verify the integrity of the EGM software when a large monetary award is won prior to paying the award to the player.

The early EGM's were all physical reel slot machines. When the player activated the game, the EGM software randomly picked a particular game outcome out of several thousand possibilities. The software then instructed the game controller to activate stepper motors connected to each reel, in a coordinated manner, to cause the reels to spin and then stop one at a time (simulating the much older mechanical slot machines) so that symbols on the reels lined up, or were intentionally misaligned, on one or more paylines, in accordance with the selected game outcome. The credit meter was then credited by an amount corresponding to the game outcome minus the amount wagered.

The early physical reel EGMs did not require a large amount of memory storage to store the EGM software. Since the EGM software was relatively small in size it was feasible to store the software on a removable read only memory (ROM) chip. Casinos were given a reference ROM chip for each version of EGM software so that the casinos could verify the ROM chip in the EGM was authentic. The verification of the EGM ROM chip involved interrupting the play of the EGM, removing the EGM ROM chip from the EGM and inserting both the EGM ROM chip and the reference ROM chip into a comparator device which compared each bit of the EGM ROM chip with each bit of the reference ROM chip to determine if software stored on both chips was identical.

The early physical reel EGMs were succeeded, though not entirely replaced by video slot EGMs. Video slot EGMs incorporate a display screen, such as an LCD screen, on which video images are displayed to present the game of chance to the player instead of using physical reels to present the game. The data storage requirements of video slot EGMs was and is vastly greater than the data storage requirements of the early physical reel EGMs. Video slot EGMs require a relatively large amount of data storage space largely because the artwork and images displayed on the display screen require large amounts of data storage space. As video display technology improves over time, the data storage requirements of EGMs (video slot EGMs, in particular) likewise increases to take advantage of that improved technology. For example, new higher resolution display screens allow for the display of more detailed and higher resolution graphics and animations, which require more data storage space.

As the software storage requirements of EGMs increased over the years it has become impractical to store the entire EGM software on a single ROM chip. This is partly because ROM chips become an impractical storage medium for software as large as EGM software has become compared to other storage mediums. It is also impractical because the ROM chips must be physically replaced if the EGM software is to be updated. Another consequence of the increasing size of EGM software is a corresponding increase in the length of time it would take to compare the EGM software bit for bit with a reference version of the EGM software when it is desired to authenticate the EGM software. The length of time it would take to conduct such a bit by bit comparison of the entire EGM software makes it impractical to do so for the purpose of authenticating the EGM software of modern EGMs.

Alternative methods of authenticating EGM software have also been devised. One such method is described in U.S. Pat. No. 5,643,086 to Alcorn et al., and which is hereby incorporated by reference herein. The method described in Alcorn involves the use of both hash functions and public key cryptography.

A hash function is a computational procedure that produces a hash value from a data set. The hash function produces the hash value with a predetermined number of bits, or fixed size. The data set that the hash function operates on may be of any size. A particular hash function will produce a unique hash value from a particular data set. Hash values are often used as indexes in a table to speed up searching a list for a particular item. In most practical uses, the fixed-size of the hash value is much smaller than the average size of the data set. Hash values are often used as part of a computer security protocol for verifying the authenticity of a data set. For example, two hash values can be created from a particular data set at a two different points in time. It may be assumed that the data set has not been modified or corrupted if the two hash values are compared and found to be identical. However, it is possible to modify the data set such that the hash value of the modified data set is identical to a hash value of the unmodified data set, thus defeating the purpose of using the hash function as an authentication mechanism. Hash functions which are particularly difficult to reverse engineer in this manner are known as one-way hash functions and the hash values produced therefrom are called message digests.

Public key cryptography is an encryption/decryption technique for securely exchanging or storing data. Public key cryptography involves the creation of a paired private key and public key from a key generating program. The private key is kept in the custody of a single entity and the public key is distributed to those who wish to securely send messages to the single entity or to those who wish to authenticate data or messages as being from the single entity. For example, a sending party uses the public key to encrypt a data set, the sending party sends the encrypted data set to a receiving party, and the receiving party uses the private key to decrypt the encrypted data set. A third party without a copy of the private key who gains access to the encrypted data set cannot easily decrypt the encrypted data set.

In situations where the ability to authenticate a data set is desired and there is no concern about keeping the data set secret, public key cryptography can be combined with the hash function described above. The technique involves using a hash function to create a hash value from the data set and then encrypting the hash value with a private key to produce what is referred to as a signature. At a later point in time, the data set is authenticated by (1) decrypting the signature to produce the original hash value, (2) using the original hash function on the data set to create a recent hash value, and (3) comparing the original hash value to the recent hash value. If the original hash value and the recent hash value are identical, then the data set is assumed to be authentic.

Alcorn's method of authenticating EGM software involved storing both an authentication program and the operating system on a removable boot ROM. The authentication program contained a message digest program for creating hash values, or message digests, a decryption program and a public decryption key. Game software was stored on a separate hard drive accessible by the game controller. Also stored on the hard drive was one or more signatures of the game software. When the EGM was started, the authentication program verified the authenticity of the game software using the supplied signature(s). If the authentication program determined the game software to be authentic then the controller was allowed to execute the game software, otherwise the game software was not allowed to execute. The authenticity of the operating system and authentication program was verifiable by removing the boot ROM chip and comparing the data of the boot ROM chip with that of a reference boot ROM chip kept in the custody of the casino. Thus, the boot ROM chip verified the authenticity of the software stored on the hard drive and a comparison of the EGM boot ROM chip with a reference boot ROM chip verified the authenticity of the EGM boot ROM chip.

Alcorn's authentication method was accepted by gaming regulatory authorities and helped facilitate the spread of high definition video slot EGMs. Speeding up the authentication process was not the only benefit of Alcorn's method. The method also freed the game software from being coded in non-rewritable media such as the removable ROM chip. Since the game software was now stored in a medium that was writable, the game software could potentially be updated in a manner which did not disrupt the operation of the EGM, for example by updating the game software from a server connected to the EGM by a network. However, storing the operating system or portions of the operating system on the removable ROM chip also requires replacing the ROM chip when upgrading the operating system. Game manufacturers have met resistance from casino operators when offering even free operating system upgrades when those upgrades require down time of the EGM, as is necessary when the operating system is stored on a ROM chip.

SUMMARY OF THE INVENTION

Embodiments of the invention relate to a multi-tiered authentication system for EGMs that can quickly authenticate software on the EGM and allows operating system and boot code to be upgraded without physically replacing ROM chips within the EGM. A first authentication program is stored within a removable ROM chip and is executed to verify the authenticity of the boot code and the operating system which is stored on a writable boot chip. If the authenticity of the boot code and the operating system is verified, a game controller of the EGM is allowed to execute the boot code and load the operating system from the writeable boot chip. If the authenticity of the boot code and the operating system is in question, the game controller is not allowed to execute the boot code or load the operating system. A second authentication program is stored on the writeable boot chip. The second authentication program executes after the game controller has loaded the operating system and verifies the authenticity of game software stored on a mass data storage device. If the game software is determined to be authentic the second authentication program allows the game software to be executed.

In various embodiments, the boot code and operating system portions residing on the writable boot chip may be upgraded without requiring that the chip be physically replaced, and preferably without incurring any down time for the EGM. The removable ROM chip can also be physically removed and authenticated to attain a high degree of confidence that both the contents of the rewritable boot chip and the mass data storage device are authentic.

Some embodiments involve the second authentication program verifying that the contents of the removable ROM chip are authentic during run time of the operating system. Having the second authentication program authenticate the removable ROM chip adds an additionally layer of security beyond verifying the authenticity of the removable ROM chip by removing the chip and comparing the chip to a reference chip. Some embodiments involve an embedded controller connected to both the removable ROM chip and the writable boot chip. Upon initial power up of the EGM, the embedded controller loads the first authentication program and performs the authentication of the boot code and the operating system portions on the writable boot chip in place of the game controller performing these tasks. If the embedded controller determines that the contents of the writable boot chip are authentic, then the embedded controller signals the game controller to start the boot process and load the boot code and the operating system portions from the writable boot chip. If the embedded controller determines that the contents of the writable boot chip are not authentic, the embedded controller prevents the game controller from starting the boot process and signals some indication mechanism of the EGM, such as a speaker or light, to indicate to a technician that there is a problem with the EGM.

One embodiment involves a computer system having first and second processors, a read only memory chip storing data including a first authentication program, a writable memory chip storing data including a second authentication program, and a mass data storage device for storing data. Upon startup of the computer system, the first processor executes the first authentication program, the first authentication program determines whether at least a portion of the data stored on the writable memory chip is authentic, the first authentication program causes the second processor to execute the second authentication program only when the determination by the first authentication program is affirmative. Upon execution of the second authentication program by the second processor, the second authentication program determines whether at least a portion of the data stored on the mass data storage device is authentic, the second authentication program permits authenticated use of the portion of the data stored on the mass data storage device only when the determination by the second authentication program is affirmative.

Other subsidiary aspects may involve the read only memory chip being removably connected to the computer system; the second authentication program additionally authenticating the data of the read only memory chip; and the first and second authentication programs authenticating data by using signatures, hash functions and public encryption keys.

Another embodiment involves a method of performing a multi-tiered authentication process on a computer system. The method involves executing a first authentication program stored on a first memory device to authenticate at least a portion of data stored on a second memory device; executing a second authentication program stored on the second memory device to authenticate at least a portion of data stored on a third memory device; and allowing use of the portion of data on the third memory device only when the second authentication program determines the portion of data on the third memory device to be authentic. The method may further include executing the first authentication program on a first processor and executing the second authentication program on a second processor. The method may further involve supplying a startup signal to the second processor only when the determination from the first authentication program is affirmative.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

DETAILED DESCRIPTION OF THE PREFERRED EMBODIMENTS

Figure 1:
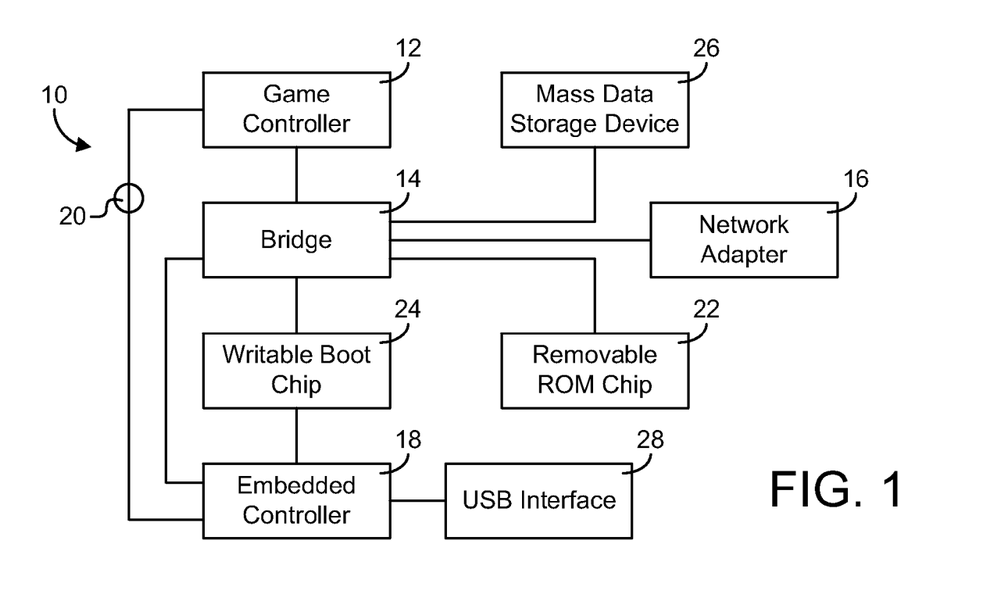
FIG. 1 is a block diagram of hardware components which implement an embodiment.

Referring to FIG. 1, Electronic Game Machine components 10 which incorporate an embodiment of the present invention are shown in FIG. 1. Embodiments of the present invention are ideally suited for use in EGMs, but may also have applicability in other industries where multi-tiered authentication is beneficial. Embodiments of the invention are herein described with reference to EGMs for descriptional purposes without intending to limit the invention to EGMs.

The EGM components 10 include a game controller 12 for controlling the overall operation of the EGM, a bridge 14 for interfacing the game controller 12 to other components of the EGM components 10, a network adapter 16 for communicating with devices outside the EGM, an embedded controller 18 which supplies a startup signal 20 to the game controller 12, a removable ROM chip 22 which is accessible to both the game controller 12 and the embedded controller 18, a writable boot chip 24 that is also accessible to both the game controller 12 and the embedded controller 18, a mass data storage device 26 that is accessible to the game controller 12 and a usb interface 28 that is accessible to the embedded controller 18.

With reference to both FIGS. 1 and 2A-2C, a multi-tiered authentication technique starts with a first authentication program 30 stored on the removable ROM chip 22. The multi-tiered authentication technique involves utilizing the first authentication program 30 stored on the removable ROM chip 22 to verify the contents of the writable boot chip 24. If the contents of the writable boot chip 24 are verified, then a second authentication program 32 stored on the writable boot chip 24 verifies the contents of the mass data storage device 26. If the contents of the mass data storage device 26 are verified, then the game controller 12 is allowed to load one or more game packages 34 stored on the mass data storage device 26. In this manner, the removable ROM chip 22 authenticates the writable boot chip 24 which in turn authenticates the mass data storage device 26. The contents of the writable boot chip 24 and the mass data storage device 26 are thereby verified and assumed to be authentic with a high degree of confidence so long as (1) the removable ROM chip 22 is verified; and (2) both the first authentication program 30 and the second authentication program 32 successfully verify the data storage devices they each respectively verify. The removable ROM chip 22 may be verified by removing the removable ROM chip 22 and comparing its contents to the contents of a reference ROM chip 22 held by a custodian, such as a casino operator. The removable ROM chip 22 may also be verified by the second authentication program 32 after the operating system 26 and second authentication program 32 have been loaded into the game controller 12.

Figure 2A:
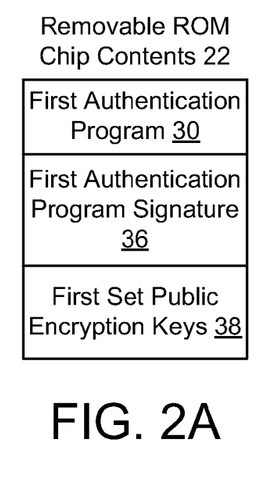
FIGS. 2A-2C are schematic diagrams illustrating the contents of three data storage devices shown in FIG. 1.
Figure 2B:
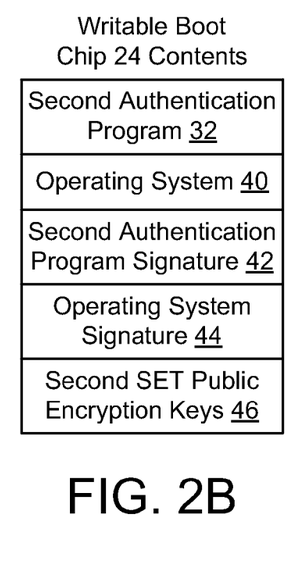
Figure 2C:
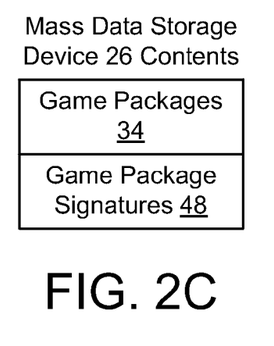

In addition to storing the first authentication program 30, the removable ROM chip 22 also stores a first authentication program signature 36 and a first set of one or more public encryption keys 38. In addition to storing the second authentication program 32, the writable boot chip 24 also stores an operating system 40, a second authentication program signature 42, an operating system signature 44, and a second set of one or more public encryption keys 46. In addition to storing the game packages 34, the mass data storage device 26 also stores a set of game package signatures 48.

One of the reasons that the writable boot chip 24 is utilized instead of simply storing the second authentication program 32 and the entire operating system 40 on the mass data storage device 26 is due to the difficulties and additional programming that would be required to enable the embedded controller 18 to access the mass data storage device 26. It is much simpler to program the embedded controller 18 and to design an associated mother board to allow the embedded controller 18 to read a memory chip, such as the writable boot chip 24 than it would be to enable the embedded controller 18 to access the data stored on the mass data storage device 26. Besides having to implement drivers to access the mass data storage device 26, a file system would have to be implemented into the first authentication program 30 to allow such access. Such additional programming for the embedded controller 18 would increase the data storage requirements of the removable ROM chip 22 as well as slow the loading and execution of the first authentication program 30 into the embedded controller 18. Additionally, communication between the mass data storage device 26 and the embedded controller 18 is much slower than communication between the writable boot chip 24 and the embedded controller 18. Therefore it is much quicker for the embedded controller 18 to verify data on the writable boot chip 24 than it would be for the embedded controller 18 to verify that data if it were stored on the mass data storage device 26.

Utilizing a processor for the embedded controller 18 that offers similar performance to the game controller 12 would unnecessarily increase the manufacturing costs of the EGM. Since the embedded controller 18 performs many less tasks and interacts with much less hardware than the game controller 12, the type of microprocessor chosen for the embedded controller 18 can be and is typically much less complex and expensive than the type chosen for the game controller 12. As a result of the reduced complexity and cost, the software execution speed of the embedded controller 18 is many orders of magnitude slower than the game controller 12. It would be extremely impractical and slow to utilize the embedded controller 18 to verify the contents of the mass data storage device 26. It is therefore desirable to utilize the embedded controller 18 to verify as little data as possible before allowing the game controller 12 to boot up and continue verifying the remaining data that requires authentication at a much faster pace. Thus, in some embodiments, as minimal a portion of the operating system 40 that is necessary to allow the game controller 12 to boot up, access the mass data storage device 26 and execute the second authentication program 32 is stored on the writable boot chip 24 instead of the entire operating system 40. Such a minimalist operating system portion might include just a boot loader, kernel and file system and drivers for accessing the mass data storage device 26. The embedded controller 18 would in this case verify as little data as possible before ceding continued verification responsibility to the game controller 12 and would be reading and verifying that data from the writable boot chip 24 much quicker than would be possible if that data were stored on the mass data storage device 26.

Figure 3:
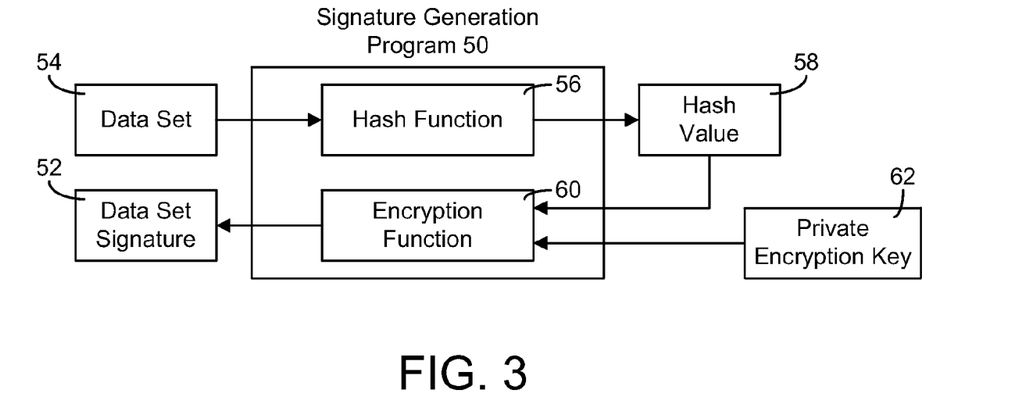
FIG. 3 is a block diagram of a signature generation program and related data used in conjunction with the hardware components of FIG. 1

Both the first authentication program 30 and the second authentication program 32 perform their authentication techniques using a combination of hash functions and public/private key cryptography. All of the signatures referenced above are ideally computed by a manufacturer of the EGM using private encryption keys which are kept secret by the manufacturer. The EGM manufacturer utilizes a signature generation program 50 as shown in FIG. 3 to generate a data set signature 52 from a data set 54. The data set 54 represent any data set that it is desired to create a signature from, whether composed of a single file or multiple files, packages, or other data formats. Some exemplary data sets that the data set 54 may represent include the first authentication program 30, the operating system 40, the second authentication program 32, and the game packages 34. The signature generation program 50 utilizes a hash function 56 to create a hash value 58 from the data set 54. The signature generation program 50 may include a single hash function 56, or may include multiple hash functions and have a predetermined technique for selecting one of several hash functions to utilize for a particular data set 54. The signature generation program 50 then utilizes an encryption function 60 to create the data set signature 52. The data set signature 52 is representative of the first authentication program signature 36, the second authentication program signature 42, the operating system signature 44 and the game packages signatures 48. The encryption function 60 creates the data set signature 52 from the hash value 58 utilizing a private encryption key 62. The private encryption key 62 is created from a standard cryptography key generation program that produces public and private key pairs. The EGM manufacturer maintains the private encryption keys and keeps them secret to prevent unauthorized third-parties from producing data sets (such as the game packages 34, FIG. 2) with corresponding signatures that could potentially be authenticated by the authentication programs 30 and 32 (FIG. 2). The EGM manufacturer ideally includes the corresponding public key on the same data storage device within the EGM that stores the authentication program that will be used to decrypt the data set signature 52. Alternatively, the public key used to decrypt a data set signature may be stored on some other data storage device, such as the data storage device on which the data set signature itself is stored, or some other convenient location. The EGM manufacturer may create separate private/public key pairs for different types of data sets, for different types of data storage devices, or even for different customers or EGM platforms.

Figure 4:
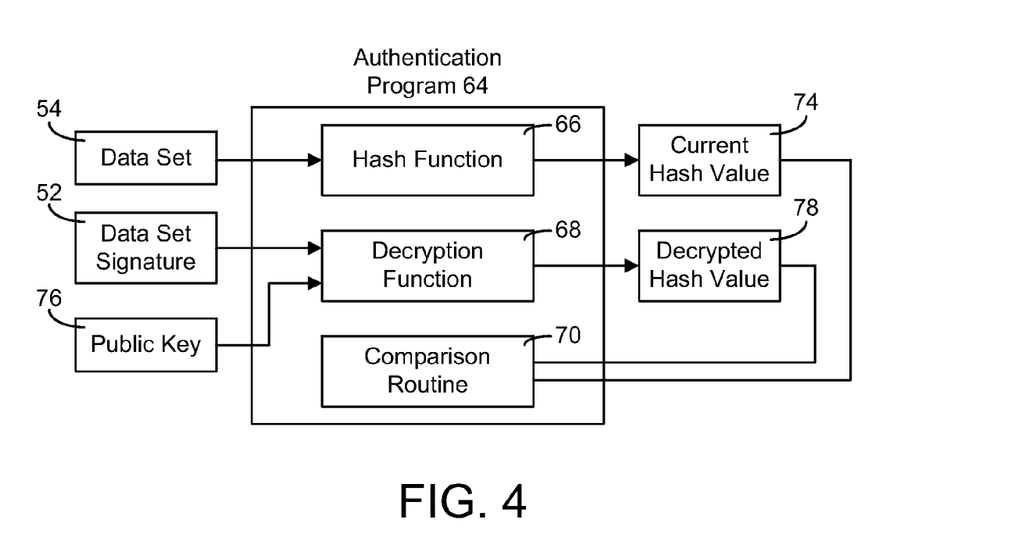
FIG. 4 is a block diagram of an authentication program and related data used in conjunction with the hardware components of FIG. 1

A detailed explanation of how the first and second authentication programs 30 and 32 verify data sets is described below with reference to FIG. 4. An authentication program 64 representative of the authentication programs 30 and 32 contains a hash function 66, a decryption function 68, and a comparison routine 70. The authentication program 64 utilizes the hash function 66 to create a current hash value 74 from the data set 54. The hash function 66 is a copy of the hash function 56 (FIG. 3) utilized by the EGM manufacturer to create the data set signature 52 described above. The authentication program 64 uses the decryption function 68 in conjunction with a public key 76 to create a decrypted hash value 78 from the data set signature 52. The public encryption key 76 is the counterpart to the private encryption key 62 (FIG. 3) that was used to create the data set signature 52. After the authentication program 64 has calculated the current hash value 74 and the decrypted hash value 78, the authentication program 64 utilizes the comparison routine 70 to compare the current hash value 74 and the decrypted hash value 78. If the hash values 74 and 78 are identical, then the data set 54 is assumed to be authentic and the authentication program 64 allows the data set 54 to be utilized. If the hash values 74 and 78 are not identical, then the data set 54 is assumed to not be authentic and the authentication program 64 supplies an indication of an authentication verification failure to a technician of the EGM through some form indication device of the EGM, such as a display, speaker or malfunction light.

Figure 5:
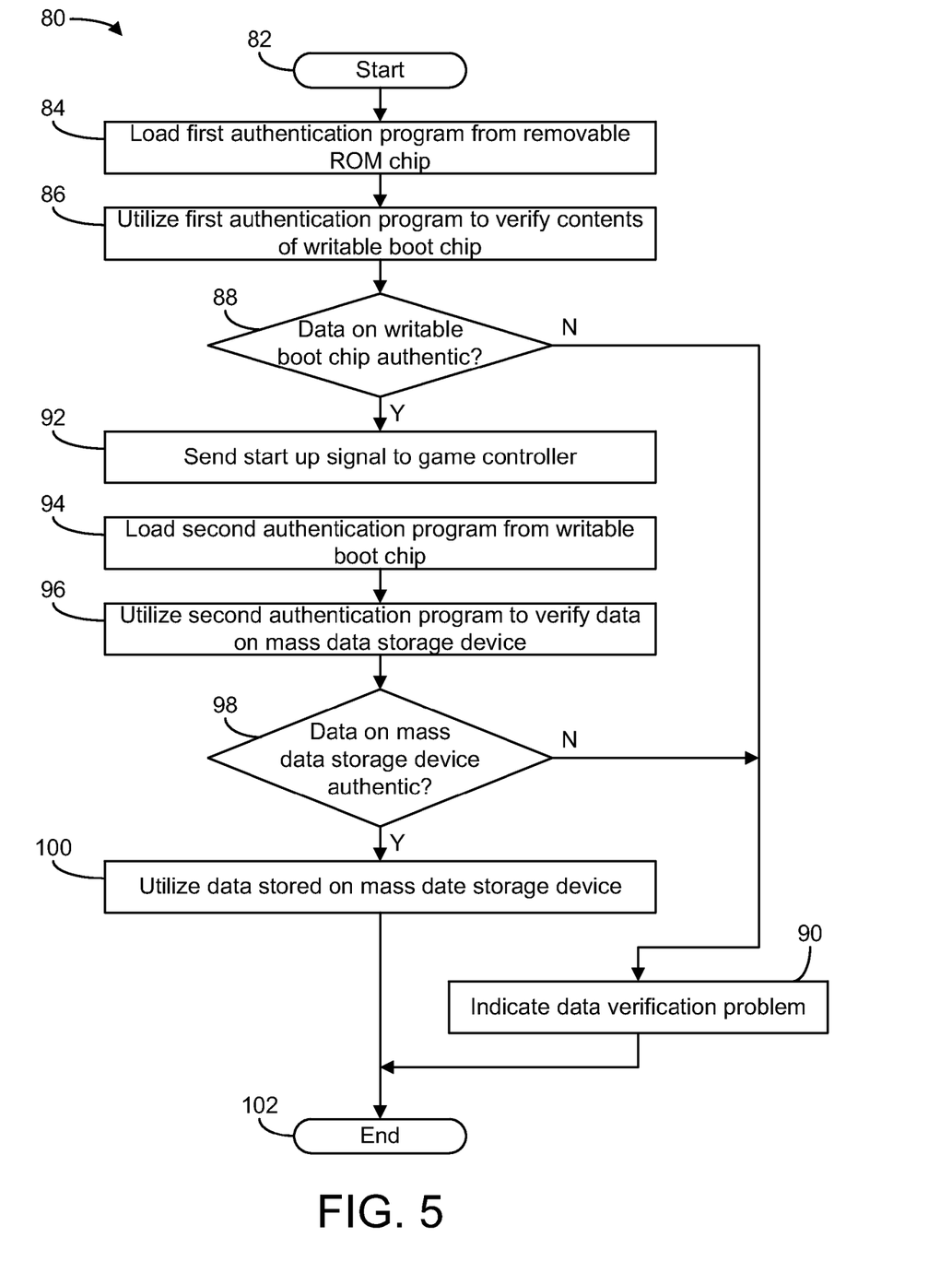
FIG. 5 is a flowchart illustrating a multi-tiered authentication technique implemented by the components shown in FIG. 1.

The boot up process of the EGM and a more detailed explanation of the multi-tiered authentication technique is described below in conjunction with a process 80 shown in FIG. 5. The process 80 starts at 82. At 84, the first authentication program 30 is loaded from the removable ROM chip 22. The first authentication program 30 is loaded into an internal memory or cache (not shown) of the embedded controller 18. Then, at 86, the first authentication program 30 is executed by the embedded controller 18 to verify the contents of the writable boot chip 24. The first authentication program 30 verifies the contents of the writable boot chip 24 by verifying the authenticity of both the operating system 40 and the second authentication program 32 stored on the writable boot chip 24. In other embodiments, the first authentication program 30 may verify the entire contents of the writable boot chip 24 at once, or may subdivide the contents of the writable boot chip 24 for authentication purposes differently than described herein. In still other embodiments, the writable boot chip 24 contains only a portion of the total operating system, the remainder of the operating system residing on the mass data storage device 26.

The first authentication program 30 utilizes one public key of the first set of public encryption keys 38 and the second authorization program signature 42 to authenticate the second authentication program 32 in the manner previously described with reference to FIG. 4. The first authentication program 30 likewise utilizes one public key of the first set of public encryption keys 38 and the operating system signature 44 to verify the authenticity of the operating system 40. The first authentication program 30 then, at 88, determines whether both the second authentication program 32 and the operating system 40 stored on the writable boot chip 24 are authentic. If the first authentication program 32 determines that either one or both of the second authorization program 32 and the operating system 40 is not authentic, then the process flow continues to 90 where the embedded controller supplies an indication that there is a data verification problem. Since the operating system 40 and associated drivers has not loaded at this point, such an indication is more likely to be a beep or light based indication than a readable message on a display screen. If the determination at 88 is affirmative, then the process continues to 92 where the embedded controller 18 sends the startup signal 20 to the game controller 12. After the embedded controller 18 has sent the startup signal 20, the embedded controller 18 has finished its programmed duties and enters into an idle state or powers off Upon receipt of the startup signal 20, the game controller 12 initiates a boot process by booting from the writable boot chip 24 and loading the operating system 40 and the second authentication program 32, at 94. The game controller 12 then, at 96, executes the second authentication program 32 to verify the data stored on the mass data storage device 26. The second authentication program 32 utilizes one of the second set of public encryption keys 46 and one of the game package signatures 48 to verify each of the game packages 34 in the manner previously described above with reference to FIG. 4. At 98, the second authentication program 32 determines whether or not all of the game packages 34 are authentic. If the determination at 98 is negative, then the process flow continues to 90 and an indication of a data verification problem is supplied to a technician. If the determination at 98 is affirmative, then the process flow continues to 100 where the operating system 40 loads one or more of the game packages 34 into an accessible random access memory (not shown) and utilizes the one or more game packages 34 to present a wagering game of chance to a player. In some embodiments, the operating system 40 may load one or more of the game packages 34 that have been authenticated while not loading any of the game packages 34 that failed the authentication. After either 90 or 100 the process 80 ends at 102.

Different embodiments may involve the second authentication program authenticating only executable code on the mass data storage device, authenticating only non-executable code, or a combination of both executable code and non-executable code. Some embodiments may involve allowing authenticated use of portions of data (such as an individual game packages) on the mass data storage device that are authenticated and disallowing use of portions of data that are determined to be unauthentic, rather than disallowing the intended use of the entirety of the data of the mass data storage device in the event that only a portion of that data is determined to be unauthentic. In the EGM embodiment thus far described, this could allow the EGM to execute authenticated game packages while preventing the execution of unauthenticated game packages. Some embodiments may allow two different levels of use of data stored on the mass data storage device depending on whether that data is determined to be authentic, rather than a strict allow/disallow result.

In some embodiments the game controller 12 executes the second authentication program 32 to verify the contents of the removable ROM chip 22 in a manner similar to that as previously described utilizing one or more of the second set of public encryption keys 46 and the first authentication program signature 36. Such authentication of the removable ROM chip 22 may be programmed to occur on a recurring basis or when certain predefined events occur, such as a win on the wagering game of chance on the EGM over a predetermined dollar amount. The removable ROM chip 22 may alternatively be authenticated simply by removing the removable ROM chip 22 from the EGM and comparing it to a reference ROM chip held in the custody of the casino operator. Ideally, the EGM components 10 are connected and programmed such that the removable ROM chip 22 may be removed without interfering with the operation of the EGM. This allows for quick authentication of the EGM software components without interrupting the operation of the EGM. Such authentication without interrupting the operation of the EGM may provide some piece of mind to a player who just won a big jackpot, as the winning symbols and big jackpot indicia on the display screen of the EGM are still present and visible during the authentication of the EGM.

As will be appreciated, the operating system 40 may be stored on media (the writable boot chip 24, or a combination of the writable boot chip 24 and the mass data storage device 26) that is writable. Thus, the operating system 40 may be upgraded through an attached media reader such as a cdrom (not shown), or from a server connected to the EGM over a network through the network adapter 16 (FIG. 1), without any requirement that a physical memory chip also be concurrently replaced. So long as the upgraded operating system includes a corresponding upgraded operating system signature that may be decrypted by one of the public keys of the first set of public keys 38, the first authentication program 30 will still be able to verify the authenticity of the upgraded operating system.

In one embodiment, a usb interface 28 connected to the embedded controller 18 is used to connect to a laptop or other computing device for the purpose of overwriting the writable boot chip 24. Such functionality may be useful in the event that the writable boot chip 24 becomes corrupted during a botched upgrade of the operating system 40. Such a corrupted writable boot chip 24 would likely be unbootable and the game controller 12 consequently unable to load the operating system 40 to attempt another write of the writable boot chip 24. This functionality of the embedded controller 18 would most likely be programmed into the software of the removable ROM chip 22 that the embedded controller 18 loads upon startup, or alternatively may be part of a program stored in a special purpose chip which temporarily replaces the removable ROM chip 22.

Figure 6:
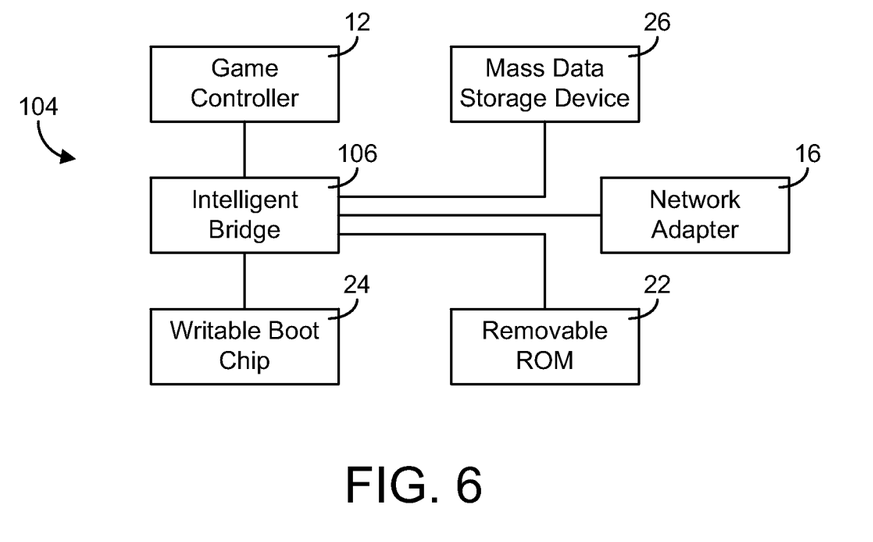
FIG. 6 is a block diagram of components representing another embodiment.

Another embodiment is represented by EGM components 104 and is shown in FIG. 6. The EGM components 104 are essentially similar to those EGM components 10 shown in FIG. 1, except for the replacement of the bridge 14 with an intelligent bridge 106, and the removal of the embedded controller 18 and usb interface 28. In the embodiment shown in FIG. 6, the intelligent bridge 106 causes the game controller 12 to boot from the removable ROM chip 22. The game controller 12 then executes the first authentication program 30 to verify the authenticity of the writable boot chip 24. When and if the authenticity of the writable boot chip is verified, the game controller 12 signals to the intelligent bridge a command to initiate a new boot cycle of the game controller 12 from the writable boot chip 24. When the game controller 12 boots from the writable boot chip 24 it loads the operating system 40 and the second authentication program 32 and proceeds with the multi-tiered authentication technique as previously described. This embodiment may have a faster boot process than the embodiment shown in FIG. 1 since the game controller 12 can authenticate the writable boot chip 24 much faster than the embedded controller 18 authenticates the writable boot chip 24 in the embodiment shown in FIG. 1.

Although the arrangement as described herein included a ROM chip, a writable memory chip may be substituted so long as the chip is not in-line programmable while connected to the other components. Other embodiments may also involve the first authentication program verifying other writable components on the motherboard, such as the basic input output system (BIOS) stored on a chip integrated into modern motherboards or system firmware. Those skilled in the art will also recognize that the hardware components described herein may be connected to one another in a manner differently than as shown. Additionally, a variety of different or additional hardware components may be used instead of any particular hardware component described herein while still retaining similar functionality and benefits.

In summary, the arrangement described herein allows for a multi-tiered authentication of the software stored in an EGM in a manner that is fast, quickly verifiable by authenticating a relative small removable ROM chip, and allows the operating system of the EGM to be upgraded without also requiring a concurrent replacement of a physical memory chip. The multi-tiered authentication technique verifies the EGM software in less time than previously known single authentication techniques while still providing for a quick removable chip verification. It is contemplated that the present invention has uses in a variety of industries beyond casino gaming. Any industry or field where there is need to have the capability to quickly authenticate and update a computer system may benefit from the use of the present invention. Of course, implementations of the invention in other fields would involve the second authentication program authenticating some data other than gaming software.

A presently preferred embodiment of the present invention and many of its improvements have been described with a degree of particularity. This description is a preferred example of implementing the invention, and is not necessarily intended to limit the scope of the invention. The scope of the invention is defined by the following claims

What is claimed is:

1. A multi-tiered authentication computer system comprising:
    a first processor;
    a read only memory chip storing data including a first authentication program executable by the first processor;
    a second processor;
    a writable memory chip storing data including (i) at least a portion of an operating system, (ii) a second authentication program executable by the second processor, said portion being required to execute the second authentication program, and (iii) a device driver for facilitating access to the mass data storage device by the second processor;
    a mass data storage device for storing data; wherein:
    upon startup of the computer system, the first processor executes the first authentication program, the first authentication program determines whether at least a portion of the second authentication program and the portion of an operating system stored on the writable memory chip is authentic, the first authentication program causes the second processor to execute the second authentication program only when the determination by the first authentication program is affirmative; and
    upon execution of the second authentication program by the second processor, the second authentication program determines whether at least a portion of the data stored on the mass data storage device is authentic, the second authentication program permits authenticated use of the portion of data stored on the mass data storage device only when the determination by the second authentication program is affirmative.

2. The multi-tiered authentication computer system as defined in claim 1, wherein the authenticated use of the data stored on the mass data storage system includes execution of executable software of the mass data storage system by the second processor.

3. The multi-tiered authentication computer system as defined in claim 1, wherein:
    the first authentication program provides at least one of a visual or audible indication of an authentication failure when the determination by the first authentication program is negative.

4. The multi-tiered authentication computer system as defined in claim 1 wherein:
    the multi-tiered authentication computer system is part of an electronic gaming machine;
    the data stored on the mass data storage device comprises a plurality of game packages each of which the electronic gaming machine uses to present a wagering game of chance to a player of the electronic gaming machine; and
    the electronic gaming machine uses only those game packages to present wagering games of chance to the player that the second authentication program has determined to be authentic.

5. The multi-tiered authentication computer system as defined in claim 1, wherein:
    the data of each of the writable memory chip and the mass data storage device further comprises at least one signature that is used by the respective first and second authentication programs to authenticate the respective portions of data stored on the writeable memory chip and the mass data storage device.

6. The multi-tiered authentication computer system as defined in claim 5, wherein:
    each of the first authentication program and the second authentication program includes a hash function for creating a hash value from a data set;
    each of the signatures is an encrypted hash value;
    each of the first authentication program and the second authentication program utilizes one or more public encryption keys for decrypting the signatures;
    each of the first authentication program and second authentication program authenticates data by:
        decrypting the signature corresponding to data being authenticated using the one or more public encryption keys to obtain a decrypted hash value;
        creating a current hash value from the data being authenticated using the respective hash function;
        comparing the decrypted hash value with the current hash value; and determining the data being authenticated to be authentic only when the decrypted hash value equals the current hash value.

7. The multi-tiered authentication computer system as defined in claim 1, further comprising an external data port in communication with the first processor; and wherein the first processor is programmed to overwrite data stored on the writeable memory chip with data supplied to the first processor through the external data port.

8. The multi-tiered authentication computer system as defined in claim 1 wherein:
the first authentication program causes the second processor to load the portion of the operating system stored on the writable memory chip only upon authenticating said portion of the operating system; and
the second processor is enabled to access the mass storage device via the device driver and caused to execute the second authentication program only upon loading said portion of the operating system.

9. A multi-tiered authentication computer system, comprising:
a first processor;
a read only memory chip storing data including a first authentication program executable by the first processor, the read only memory chip removably connected to the computer system, the read only memory chip non-inline writable while connected to the computer system, and the read only memory chip writable when removed from the computer system;
a second processor;
a writable memory chip storing data including a second authentication program executable by the second processor;
a mass data storage device for storing data; wherein:
upon startup of the computer system, the first processor executes the first authentication program, the first authentication program determines whether at least a portion of the data stored on the writable memory chip is authentic, the first authentication program causes the second processor to execute the second authentication program only when the determination by the first authentication program is affirmative; and
upon execution of the second authentication program by the second processor, the second authentication program determines whether at least a portion of the data stored on the mass data storage device is authentic, the second authentication program permits authenticated use of the portion of data stored on the mass data storage device only when the determination by the second authentication program is affirmative.

10. A multi-tiered authentication computer system, comprising:
a first processor;
a read only memory chip storing data including a first authentication program executable by the first processor;
a second processor;
a writable memory chip storing data including a second authentication program executable by the second processor;
a mass data storage device for storing data; wherein:
upon startup of the computer system, the first processor executes the first authentication program, the first authentication program determines whether at least a portion of the data stored on the writable memory chip is authentic, the first authentication program causes the second processor to execute the second authentication program only when the determination by the first authentication program is affirmative;
upon execution of the second authentication program by the second processor, the second authentication program determines whether at least a portion of the data stored on the mass data storage device is authentic, the second authentication program permits authenticated use of the portion of data stored on the mass data storage device only when the determination by the second authentication program is affirmative; and
the second authentication program additionally determines whether or not at least a portion of the data stored on the read only memory chip is authentic, and further causes a human detectable indication of an authentication failure when the portion of the data stored on the read only memory chip is determined to be unauthentic.

11. A method of performing a multi-tiered authentication process on a computer system having a first memory device, a second memory device and a third memory device, comprising:
executing a first authentication program stored on the first memory device to authenticate at least a portion of data stored on the second memory device;
executing a second authentication program stored on the second memory device to authenticate at least a portion of data stored on the third memory device only when the first authentication program determines the portion of data stored on the second memory device to be authentic;
allowing use of the portion of data on the third memory device only when the second authentication program determines the portion of data on the third memory device to be authentic;
verifying that the computer system is utilizing data from the third memory device; and
authenticating the data of the first memory device by physically removing the first memory device from the computer system and comparing the data stored on the first memory device to data stored on a reference memory device.

12. The method as defined in claim 11, further comprising:
executing the first authentication program on a first processor; and
executing the second authentication program on a second processor.

13. The method as defined in claim 12, further comprising:
supplying a startup signal to the second processor only when the determination of the first authentication program is affirmative, the second processor requiring receipt of the startup signal before executing the second authentication program.

14. The method as defined in claim 13, further comprising:
executing an authentication program on the second processor to authenticate at least a portion of data stored on the first memory device.

15. The method as defined in claim 11 further comprising:
operating the computer system without interruption when the first memory device is removed.

16. A method , of performing a multi-tiered authentication process on a computer system having a first memory device, a second memory device and a third memory device, comprising:
executing a first authentication program stored on the first memory device by a first processor to authenticate at least a portion of data stored on the second memory device;

supplying a startup signal to a second processor only when the first authentication program has determined the portion of data stored on the second memory device to be authentic;

executing a second authentication program stored on the second memory device by the second processor to authenticate at least a portion of data stored on the third memory device only when the startup signal is received;

allowing use of the portion of data on the third memory device only when the second authentication program determines the portion of data on the third memory device to be authentic; and executing on the second processor the second authentication program to authenticate at least a portion of data stored on the first memory device.

17. The method as defined in claim 16 further comprising:

executing the second authentication program on a recurring time basis.

18. A method of performing a multi-tiered authentication process on a computer system having a first memory device, a second memory device and a third memory device, comprising:

executing a first authentication program stored on the first memory device by a first processor to authenticate at least a portion of data stored on the second memory device;

supplying a startup signal to a second processor only when the first authentication program has determined the portion of data stored on the second memory device to be authentic;

executing a second authentication program stored on the second memory device by the second processor to authenticate at least a portion of data stored on the third memory device only when the startup signal is received;

allowing use of the portion of data on the third memory device only when the second authentication program determines the portion of data on the third memory device to be authentic;

updating data of at least the second memory device while the computer system is operational; and authenticating the updated data using at least one of the first or second authentication programs upon the next boot of the computer system following the data updating.

\* \* \* \* \*

UNITED STATES PATENT AND TRADEMARK OFFICE
CERTIFICATE OF CORRECTION

| | | |
|---|---|---|
| PATENT NO. | : 9,070,251 B2 | Page 1 of 2 |
| APPLICATION NO. | : 13/791638 | |
| DATED | : June 30, 2015 | |
| INVENTOR(S) | : Jerrod L. Laputz et al. | |

It is certified that error appears in the above-identified patent and that said Letters Patent is hereby corrected as shown below:

IN THE CLAIMS

In Claim 1, Column 11, Line 66, replace the first instance of "the" with --a--.
In Claim 1, Column 11, Line 67, after ";" insert --and--.
In Claim 1, Column 12, Line 1, replace "a" with --the--.
In Claim 1, Column 12, Line 6, replace "an" with --the--.
In Claim 1, Column 12, Line 7, between "," and "the" insert --and--.
In Claim 1, Column 12, Line 14, between "," and the second instance of "the" insert --and--.
In Claim 1, Column 12, Line 16, between "of" and the first instance of "data" insert --the--.
In Claim 2, Column 12, Line 20, between the second instance of "the" and "data" insert --portion of the--.
In Claim 2, Column 12, Line 21, replace "system" with --device--.
In Claim 2, Column 12, Line 22, replace "system" with --device--.
In Claim 3, Column 12, Line 27, replace "or" with --and an--.
In Claim 5, Column 12, Line 48, between "of" and "data" insert --the--.
In Claim 6, Column 12, Line 61, between "to" and "data" insert --the--.
In Claim 8, Column 13, Line 16, between "mass" and "storage" insert --data--.
In Claim 9, Column 13, Line 33, after ";" insert --and--.
In Claim 9, Column 13, Line 39, between "," and the first instance of "the" insert --and--.
In Claim 9, Column 13, Line 46, between "," and the second instance of "the" insert --and--.
In Claim 9, Column 13, Line 48, between "of" and the first instance of "data" insert --the--.
In Claim 10, Column 13, Line 60, after ";" insert --and--.
In Claim 10, Column 13, Line 66, between "," and the first instance of "the" insert --and--.
In Claim 10, Column 14, Line 6, between "," and the second instance of "the" insert --and--.
In Claim 10, Column 14, Line 8, between "of" and the first instance of "data" insert --the--.
In Claim 11, Column 14, Line 29, before "data" insert --the--.
In Claim 11, Column 14, Line 31, between the second instance of "of" and "data" insert --the--.
In Claim 11, Column 14, Line 33, between "of" and "data" insert --the--.
In Claim 16, Column 14, Line 60, delete ",".

Signed and Sealed this
Twenty-sixth Day of April, 2016

Michelle K. Lee
*Director of the United States Patent and Trademark Office*

CERTIFICATE OF CORRECTION (continued)
U.S. Pat. No. 9,070,251 B2

IN THE CLAIMS

In Claim 16, Column 15, Line 3, between "of" and "data" insert --the--.
In Claim 16, Column 15, Line 9, between the second instance of "of" and "data" insert --the--.
In Claim 16, Column 15, Line 11, between "of" and "data" insert --the--.
In Claim 18, Column 16, Line 7, between "of" and "data" insert --the--.
In Claim 18, Column 16, Line 13, between the second instance of "of" and "data" insert --the--.
In Claim 18, Column 16, Line 15, between "of" and "data" insert --the--.
In Claim 18, Column 16, Line 20, replace "or" with --and--.
In Claim 18, Column 16, Line 20, replace "the" with --a--.